US009088325B2

(12) United States Patent
Kumamoto et al.

(10) Patent No.: US 9,088,325 B2
(45) Date of Patent: Jul. 21, 2015

(54) ARRAY ANTENNA APPARATUS

(71) Applicant: Kabushiki Kaisha Toshiba, Tokyo (JP)

(72) Inventors: Tsuyoshi Kumamoto, Yokohama (JP);
Hiroyuki Kayano, Fujisawa (JP); Tamio Kawaguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 269 days.

(21) Appl. No.: 13/756,785

(22) Filed: Feb. 1, 2013

(65) Prior Publication Data
US 2014/0194293 A1 Jul. 10, 2014

(30) Foreign Application Priority Data

May 11, 2012 (JP) ................................ 2012-109532

(51) Int. Cl.
| H01Q 21/00 | (2006.01) |
| H01Q 3/00 | (2006.01) |
| H04B 1/10 | (2006.01) |
| H01Q 3/26 | (2006.01) |
| H01Q 3/34 | (2006.01) |
| H01Q 9/04 | (2006.01) |
| H01Q 13/06 | (2006.01) |
| H01Q 21/06 | (2006.01) |

(52) U.S. Cl.
CPC .. *H04B 1/10* (2013.01); *H01Q 3/26* (2013.01); *H01Q 3/34* (2013.01); *H01Q 9/0407* (2013.01); *H01Q 13/065* (2013.01); *H01Q 21/065* (2013.01)

(58) Field of Classification Search
CPC .................... H01Q 3/26; H04B 1/10

USPC ........................................... 343/893; 342/368
See application file for complete search history.

(56) References Cited

U.S. PATENT DOCUMENTS

| 3,389,352 | A | 6/1968 | Kliphuis | |
| 4,080,579 | A * | 3/1978 | Fassett | ............... 333/117 |
| 6,480,706 | B1 | 11/2002 | Mimura et al. | |
| 2002/0038720 | A1 | 4/2002 | Kai et al. | |
| 2003/0076274 | A1* | 4/2003 | Phelan et al. | ............... 343/895 |
| 2004/0150554 | A1* | 8/2004 | Stenger et al. | ............... 342/175 |
| 2004/0189533 | A1 | 9/2004 | Yamanaka et al. | |
| 2005/0113258 | A1 | 5/2005 | Kai et al. | |
| 2010/0164655 | A1 | 7/2010 | Kawaguchi et al. | |

FOREIGN PATENT DOCUMENTS

| EP | 1 014 480 A2 | 6/2000 |
| EP | 1 014 480 A3 | 6/2000 |

(Continued)

OTHER PUBLICATIONS

The Extended European Search Report issued Aug. 20, 2013, in Application No. / Patent No. 13153556.9-1811.

(Continued)

*Primary Examiner* — Dameon E Levi
*Assistant Examiner* — Hasan Islam
(74) *Attorney, Agent, or Firm* — Oblon, McClelland, Maier & Neustadt, L.L.P.

(57) ABSTRACT

According to one embodiment, an array antenna apparatus includes a distributor, transmission phase shifters, transmission amplifiers, transmission filters, transmission/reception switches, limiters, reception filters, low-noise amplifiers, reception phase shifters, a combiner, a vacuum vessel, a refrigerating unit, and a cooling plate.

6 Claims, 3 Drawing Sheets

(56) References Cited

FOREIGN PATENT DOCUMENTS

| | | |
|---|---|---|
| EP | 1 160 910 A1 | 12/2001 |
| EP | 1 696 509 A1 | 8/2006 |
| JP | 03-089632 A | 4/1991 |
| JP | 05-107335 A | 4/1993 |
| JP | 2000-236206 | 8/2000 |
| JP | 2005-278016 A | 10/2005 |
| JP | 2009-231948 A | 10/2009 |
| JP | 2013-258595 A | 12/2013 |

OTHER PUBLICATIONS

Office Action issued Apr. 1, 2014 in Japanese Patent Application No. 2012-109532 (with English language translation).

* cited by examiner

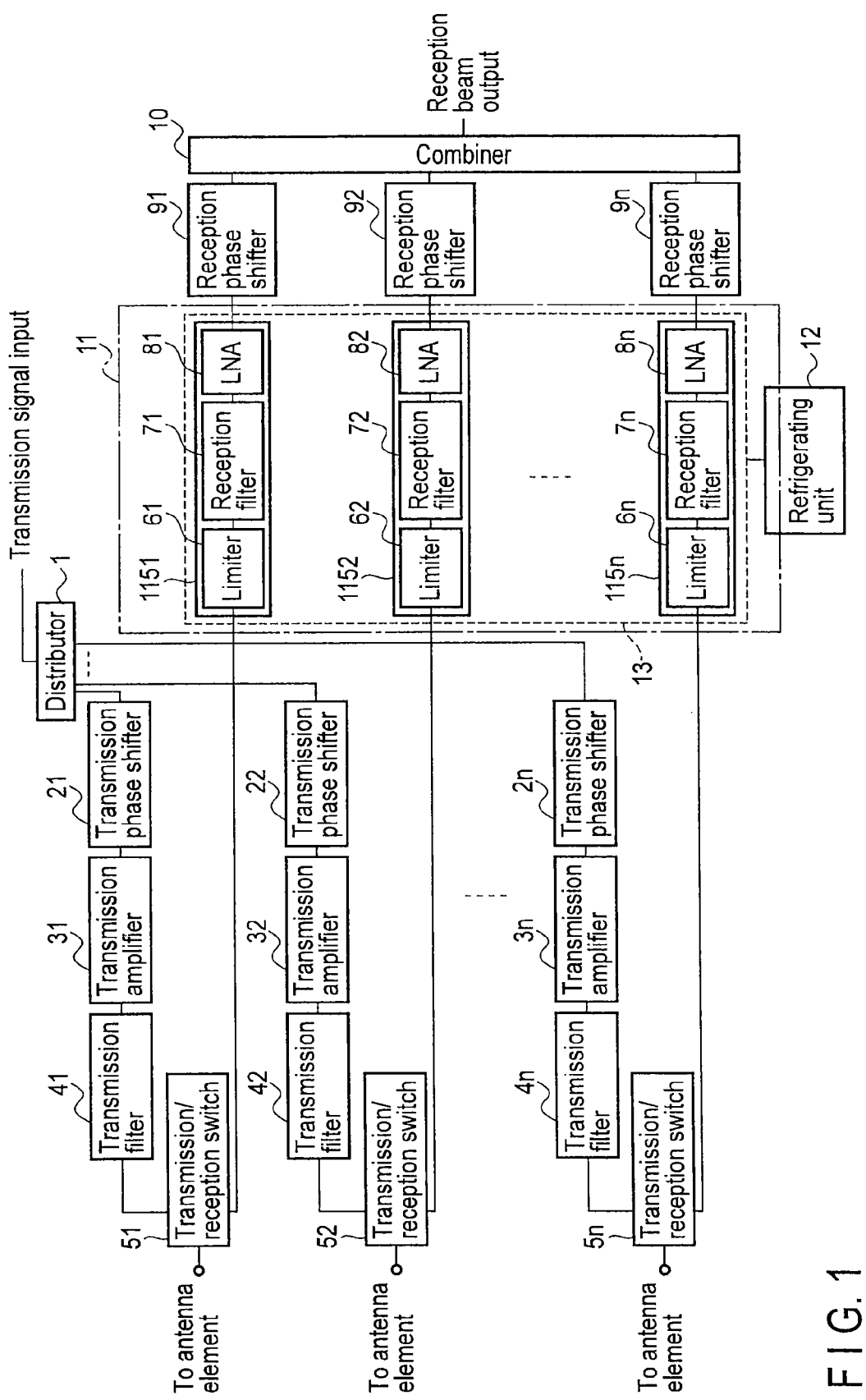
F I G. 1

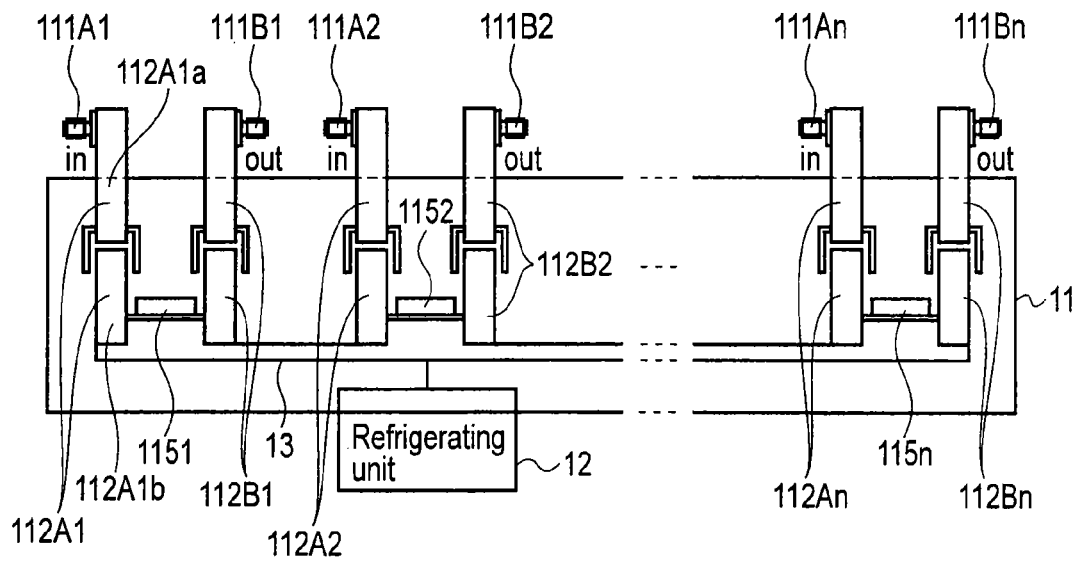
F I G. 2
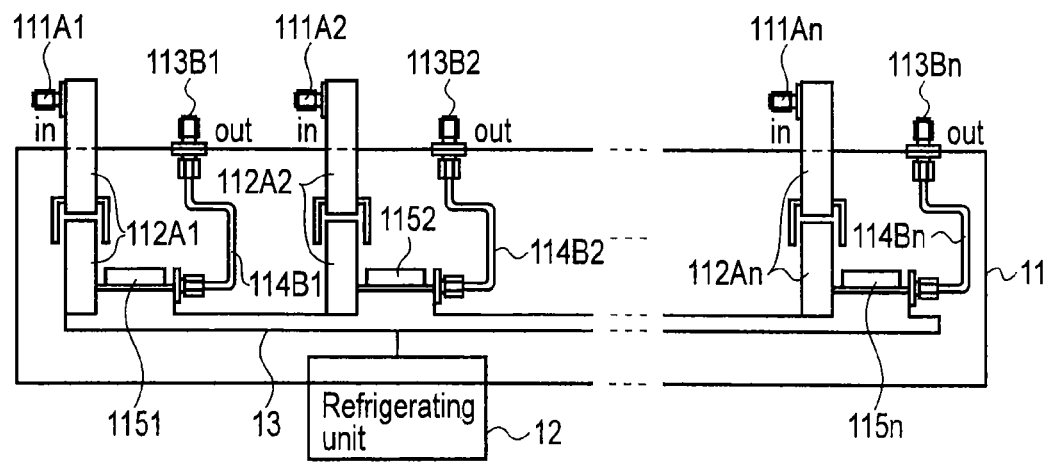
F I G. 3

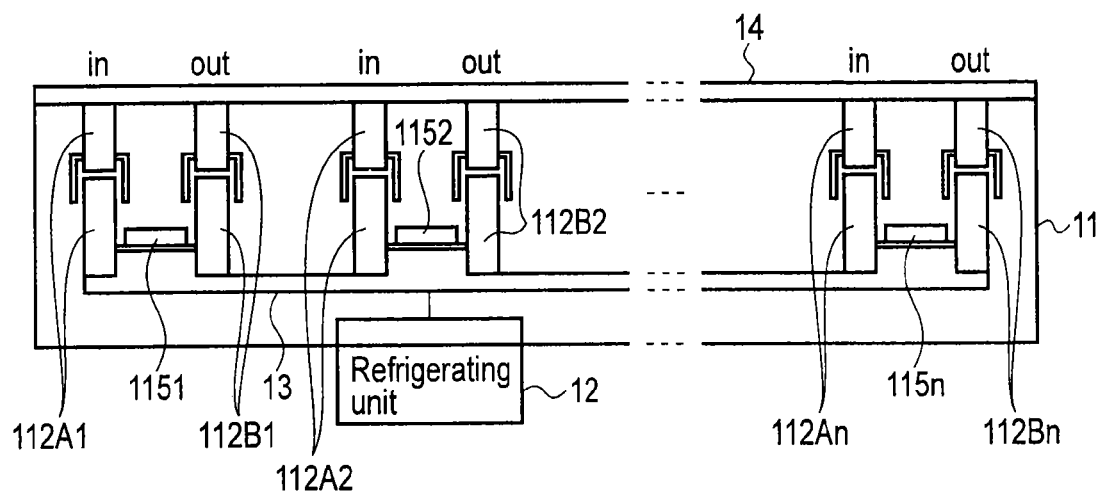
F I G. 4

ARRAY ANTENNA APPARATUS

CROSS-REFERENCE TO RELATED APPLICATIONS

This application is based upon and claims the benefit of priority from Japanese Patent Application No. 2012-109532, filed May 11, 2012, the entire contents of which are incorporated herein by reference.

FIELD

Embodiments described herein relate generally to an array antenna apparatus used as a receiving antenna for a radar system, communication system, microwave radiometer, radio reception system, and the like.

BACKGROUND

A system having a signal receiving function such as a radar or communication system is designed to improve reception sensitivity by reducing the noise temperature of the reception subsystem. The noise temperature of this subsystem is generally caused by the transmission loss occurring in the transmission line from the antenna to a low-noise amplifier (LNA) and the internal noise generated in the LNA.

As a method of reducing this transmission loss and internal noise, there has been proposed a method of housing the transmission line from the antenna to the LNA, electronic circuits such as a reception filter, and the LNA in a thermally insulating container such as a vacuum vessel and cooling them to a superconducting phase by using a refrigerating unit or the like. Cooling the transmission line and the electronic circuits to a superconducting phase will reduce the transmission loss occurring in the transmission line from the antenna to the LNA close to zero. In addition, cooling the LNA to a superconducting phase will reduce the internal noise in the LNA. The conventional method proposed above is designed to improve the sensitivity of a reception subsystem by reducing the transmission loss between the antenna and the LNA to almost zero and reducing the internal noise in the LNA by using a superconductivity technique.

A conventional antenna apparatus based on the above proposal uses an airtight coaxial connector for an electrical (high-frequency) interface which connects a normal-temperature unit outside a thermally insulating container to a cryogenic unit inside the thermally insulating container. The antenna apparatus uses a coaxial cable in the thermally insulating container for connection from the coaxial connector to the high-frequency circuit.

The antenna apparatus having the above arrangement, however, uses the coaxial connector and the coaxial cable for the coupling portion between the normal-temperature unit and the cryogenic unit, and hence the normal-temperature unit is connected to the cryogenic unit through the outer conductors (metal) of the coaxial connector and coaxial cable. In this case, heat from the normal-temperature unit flows into the cryogenic unit through the outer conductors (metal), raising the temperature of the cryogenic unit. It is therefore necessary to provide a cooling capacity that takes into account the rise in temperature due to heat flow. This inevitably increases the size of a cooling means such as a refrigerating unit.

As a method of suppressing an increase in the size of the above cooling means, it is conceivable to use a method of reducing heat flow by decreasing the diameter of the coaxial cable. This method, however, increases the transmission loss in the coaxial cable, and hence the reception sensitivity deteriorates. In contrast, if the diameter of the coaxial cable is increased to maintain high sensitivity, the heat flow increases. In this case, since it is necessary to consider an increase in temperature due to the increased heat flow, the size of the cooling means increases. In addition, the above connection method requires the use of an expensive airtight coaxial connector. It is also necessary to structurally ensure a size that allows the connector to be mounted.

BRIEF DESCRIPTION OF THE DRAWINGS

FIG. 1 is a block diagram showing the arrangement of an array antenna apparatus according to an embodiment;

FIG. 2 is a sectional view showing the structure of a vacuum vessel used for the array antenna apparatus shown in FIG. 1;

FIG. 3 is a sectional view showing the structure of the first modification of the vacuum vessel used for the array antenna apparatus according to this embodiment; and FIG. 4 is a sectional view showing the structure of the second modification of the vacuum vessel used for the array antenna apparatus according to this embodiment.

DETAILED DESCRIPTION

In general, according to one embodiment, an array antenna apparatus includes a distributor, transmission phase shifters, transmission amplifiers, transmission filters, transmission/reception switches, limiters, reception filters, low-noise amplifiers, reception phase shifters, a combiner, a vacuum vessel, a refrigerating unit, and a cooling plate.

An embodiment will be described below with reference to the views of the accompanying drawing.

FIG. 1 is a block diagram showing the arrangement of an array antenna apparatus according to this embodiment.

The array antenna apparatus includes a distributor 1, transmission phase shifters 21 to 2$n$, transmission amplifiers 31 to 3$n$, transmission filters 41 to 4$n$, transmission/reception switches 51 to 5$n$, limiters 61 to 6$n$, reception filters 71 to 7$n$, low-noise amplifiers (LNAs) 81 to 8$n$, reception phase shifters 91 to 9$n$, a combiner 10, a vacuum vessel 11, a refrigerating unit 12, and a cooling plate 13.

Note that the array antenna apparatus includes n transmission subsystems and n reception subsystems which are provided in correspondence with n antenna elements arranged in an array pattern and are respectively connected to them.

The distributor 1 distributes transmission signals input from a host apparatus.

The transmission phase shifters 21 to 2$n$ control the phases of the transmission signals distributed from the distributor 1 to desired phases.

The transmission amplifiers 31 to 3$n$ amplify the powers of the transmission signals output from the transmission phase shifters 21 to 2$n$.

The transmission filters 41 to 4$n$ extract signals in a specified transmission frequency band from the transmission signals output from the transmission amplifiers 31 to 3$n$, and cut off the remaining frequency components.

The switches 51 to 5$n$ switch between the transmission subsystem and the reception subsystem. As the switches 51 to 5$n$, for example, circulators or coaxial switches are used.

The limiters 61 to 6$n$ provide protection against excessive inputs to the subsequent stage by limiting the signal levels of the reception signals input to the reception subsystems.

The reception filters 71 to 7*n* pass signals in a specified reception frequency band and cut off the remaining frequency components. A superconducting material is used for the reception filters 71 to 7*n*.

The LNAs 81 to 8*n* amplify the reception signals passing through the reception filters 71 to 7*n* with low noise.

Note that FIG. 1 shows the limiters 61 to 6*n*, the reception filters 71 to 7*n*, and the LNAs 81 to 8*n* as reception circuits 1151 to 115*n*.

The reception phase shifters 91 to 9*n* control the reception signals amplified by the LNAs 81 to 8*n* to make them have desired phases.

The combiner 10 combines the respective reception signals output from the reception phase shifters 91 to 9*n*.

The vacuum vessel 11 provides thermal insulation and thermal retention for the reception circuits 1151 to 115*n* constituted by the limiters 61 to 6*n*, the reception filters 71 to 7*n*, and the LNAs 81 to 8*n*, which are housed in the container. The vacuum vessel 11 is a vessel for providing thermal insulation by setting the surroundings of the superconducting materials arranged in the container in a vacuum phase in order to efficiently maintain a very low temperature. For this reason, the surroundings where at least the superconducting materials are arranged in the vacuum vessel 11 are formed into an airtight structure including the interface connectors.

The refrigerating unit 12 and the cooling plate 13 are cooling means for cooling the transmission lines and the reception circuits 1151 to 115*n* in the vacuum vessel 11 to a very low temperature.

In the above arrangement, the distributor 1 distributes/supplies the transmission signals input from a host apparatus to the transmission phase shifters 21 to 2*n* arranged in an array pattern. The transmission phase shifters 21 to 2*n* control the signals to make them have desired phases. The transmission amplifiers 31 to 3*n* amplify the powers of the signals. The transmission filters 41 to 4*n* suppress unnecessary wave components. The resultant signals are then emitted from the antenna elements to the space via the transmission/reception switches 51 to 5*n*.

The reception signals received by the respective antenna elements are input to the reception circuits via the transmission/reception switches 51 to 5*n*. The reception filters 71 to 7*n* suppress unnecessary wave components of the signals via the limiters 61 to 6*n* arranged in the vacuum vessel 11. The LNAs 81 to 8*n* amplify the signals. Thereafter, the reception phase shifters 91 to 9*n* control the signals to make them have desired phases. The combiner 10 combines the signals and outputs the resultant signal as a reception beam.

FIG. 2 is a sectional view showing the structure of the vacuum vessel 11 in the array antenna apparatus shown in FIG. 1.

The transmission lines which connect the limiters 61 to 6*n*, the reception filters 71 to 7*n*, and the LNAs 81 to 8*n*, and the reception filters 71 to 7*n* are formed from a superconducting material. The refrigerating unit 12 and the like which are connected to the vacuum vessel 11 cool the transmission lines and the reception filters 71 to 7*n* to a very low temperature at which they achieve a superconducting phase. Note that like FIG. 1, FIG. 2 shows the limiters 61 to 6*n*, the reception filters 71 to 7*n*, and the LNAs 81 to 8*n* as the reception circuits 1151 to 115*n*.

Referring to FIG. 2, the reception signals received by the antenna elements are input to the reception circuits 1151 to 115*n* in the vacuum vessel 11 via coaxial waveguide converters 111A1 to 111A*n* and noncontact waveguides 112A1 to 112A*n* on the input side. In this case, the cooling plate 13 in the vacuum vessel 11 cools the reception circuits 1151 to 115*n* to a very low temperature. Cooling the reception circuits 1151 to 115*n* to a very low temperature will bring the transmission lines and the reception filters 71 to 7*n*, which use a superconducting material, into a superconducting phase. As a consequence, the transmission loss approaches zero. In addition, cooling the LNAs 81 to 8*n* in the reception circuits 1151 to 115*n* to a very low temperature will reduce the noise generated internally.

The signals amplified with low noise by the LNAs 81 to 8*n* are output to the normal-temperature unit via noncontact waveguides 112B1 to 112B*n* and coaxial waveguide converters 111B1 to 111B*n* on the output side.

Note that maintaining a very low temperature state in the vacuum vessel 11 while minimizing the influences of heat flow and thermal radiation from the normal-temperature unit will lead to a reduction in the size of a cooling means such as a refrigerating unit. For this reason, as shown in FIG. 2, the array antenna apparatus according to this embodiment uses the noncontact waveguides 112A1 to 112A*n* and the noncontact waveguides 112B1 to 112B*n* as electrical (high-frequency) interfaces between the normal-temperature unit outside the vacuum vessel 11 and the cryogenic unit inside the vacuum vessel 11. Take the noncontact waveguide 112A1 shown in FIG. 2 as an example. A first portion 112A1*a* is part of the noncontact waveguide 112A1 which is partly located outside the vacuum vessel 11, and has predetermined heat due to the normal temperature outside the vacuum vessel 11. However, a second portion 112A1*b* of the noncontact waveguide is not physically connected to the first portion 112A1*a* of the noncontact waveguide. The array antenna apparatus according to this embodiment therefore can greatly reduce the inflow of heat due to thermal conduction as in the related art, and hence can reduce the size of the cooling means required for cooling.

Note that, for example, a choke structure is used for the noncontact portion of each waveguide as a means for reducing transmission loss.

The cooling portions for a very low temperature at which a superconducting material achieves a superconducting phase suffice to include at least the reception circuits 1151 to 115*n* using the superconducting material. As is obvious from FIG. 2, the second portion 112A1*b* of the above noncontact waveguide is connected as an electrical (high-frequency) interface for this portion for cooling to a very low temperature, and the first portion 112A1*a* of the noncontact waveguide accompanying thermal conduction from the normal-temperature unit is not physically connected to the second portion 112A1*b* of the noncontact waveguide.

The above waveguide may have an airtight structure having a general hollow shape and using a vacuum window or the like. In addition, as shown in FIG. 2, if a plurality of circuits are housed in a single vacuum vessel 11 to form an integral structure, a reduction in size can be effectively achieved by using a waveguide loaded with a dielectric body and the wavelength shortening ratio of the loaded dielectric body. In addition, it is possible to form an airtight structure without using a vacuum window or the like in order to maintain a vacuum in the vacuum vessel 11 with the loaded dielectric body. Furthermore, the ratio of the length to the width of the waveguide loaded with the dielectric body can be flexibly selected to achieve optimal design in accordance with the placement space. This structure is therefore effective when the waveguide is located in a limited space to reduce size and weight.

FIGS. 1 and 2 show an integral structure formed by housing the plurality of reception circuits 1151 to 115*n* in the vacuum vessel 11. However, the vacuum vessel 11 may be partitioned for each of the reception circuits respectively corresponding to the antenna elements.

In addition, FIGS. 1 and 2 show an arrangement for cooling the plurality of reception circuits 1151 to 115n by using the cooling plate 13. However, the cooling plate 13 may be provided for each of the reception circuits respectively corresponding to the antenna elements to individually cool each reception circuit.

(First Modification)

FIG. 3 is a sectional view showing the structure of the first modification of the vacuum vessel 11 in the array antenna apparatus according to this embodiment.

Referring to FIG. 2, noncontact waveguides are used as both the waveguide on the input side and the waveguide on the output side for reception signals. As shown in FIG. 3, however, connection on only one side may be made through a noncontact waveguide, and connection on the other side may be made through a coaxial cable within the range in which heat inflow is allowed.

It is known that system noise temperature is dominantly caused by transmission loss from the antennas to the LNAs 81 to 8n and internal noise in the LNAs 81 to 8n. That is, even if transmission loss caused when the reception signals amplified with low noise by the LNAs 81 to 8n are transmitted to the normal-temperature unit increases to a certain degree, its influence on system noise temperature is low.

For this reason, for example, as shown in FIG. 3, it is possible to provide a high-sensitivity array antenna apparatus with reduced system noise temperature even with an arrangement using airtight coaxial connectors 113B1 to 1113Bn and coaxial cables 114B1 to 114Bn on the output side.

In addition, since transmission loss after amplification with low noise in the above manner does not influence much on a deterioration in system noise temperature, it is possible to reduce the inflow of heat by using small-diameter coaxial cables as the coaxial cables 114B1 to 114Bn on the output side.

(Second Modification)

FIG. 4 is a sectional view showing the structure of the second modification of the vacuum vessel 11 in the array antenna apparatus according to this embodiment.

In this case, waveguide/strip line conversion or waveguide/microstrip conversion is performed by employing an electromagnetic coupling scheme using a circuit board 14 instead of employing a conventional method using the coaxial waveguide converters 111A1 to 111An and 111B1 to 111Bn, shown in FIG. 2.

That is, the circuit board 14 is formed by mounting components such as the transmission/reception switches 51 to 5n arranged in the normal-temperature unit on a single substrate or multiplayer substrate. The circuit board 14 uses the electromagnetic coupling scheme for connection between internal transmission lines (microstrip lines or strip lines) and the waveguides in the vacuum vessel 11. This makes it possible to reduce the number of airtight coaxial connectors to be used as compared with the conventional scheme. The circuit board 14 is designed to reduce the number of airtight coaxial connectors to be used to reduce the material cost and eliminate the necessity of a space for airtight coaxial connectors, thereby achieving a reduction in size. This makes it possible to obtain a thin, flat structure including the vacuum vessel 11 as shown in FIG. 4.

In addition, using a flat antenna such as a patch antenna as an antenna element can implement a thin structure including antenna elements.

As described above, the array antenna apparatus according to the above embodiment uses the noncontact waveguides 112A1 to 112An and 112B1 to 112Bn as electrical (high-frequency) interfaces between the normal-temperature unit outside the vacuum vessel 11 and the cryogenic unit inside the vacuum vessel 11. This eliminates the physical connecting portion with the normal-temperature unit in the array antenna apparatus. This makes it possible to greatly reduce the inflow of heat by thermal conduction and achieve a reduction in size of the cooling means necessary for cooling. This can provide an array antenna apparatus which has improved the sensitivity of the reception subsystem.

The above array antenna apparatus can be applied to a mechanically rotated array antenna using no phase shifter or any one of a phased array antenna, a passive array antenna, and an active array antenna each including a phase shifter for each antenna element or sub-array.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active phased array antenna apparatus comprising:
   a plurality of antenna elements arranged in an array pattern;
   a plurality of reception circuits corresponding to the respective antenna elements;
   a plurality of phase shifters provided correspondingly to the reception circuits and controls phase of a signal output from the reception circuits to desired phase;
   a vacuum vessel houses the plurality of reception circuits and insulates external heat to maintain an extremely-low temperature state;
   a cooling unit cools the plurality of the reception circuits in the vacuum vessel;
wherein each of the reception circuits comprising:
   a reception filter passes a reception signal, out of signals received by the corresponding antenna elements, which falls within a desired frequency band; and
   a low-noise amplifier (LNA) amplifies a reception signal having passed through the reception filter with low noise;
   the reception filter and a connecting wire between the reception filter and the low-noise amplifier are formed with superconducting materials achieve a superconducting phase by cooling of the cooling unit;
   a noncontact waveguide loaded with a dielectric body is used for at least one electrical (high frequency) interface to connect an input signal and an output signal between extremely-low temperature side inside of the vacuum vessel and normal temperature side outside of the vacuum vessel; and
   an airtight structure of the vacuum vessel is formed with the dielectric body.

2. The active phased array antenna apparatus of claim 1, further comprising a limiter provided on an input side of the low-noise amplifier and limits a signal level of a signal from the antenna element,
   wherein the vacuum vessel also houses the limiter.

3. The active phased array antenna apparatus of claim 1, wherein the vacuum vessel brings a surrounding where at least a superconducting material forming the reception filter is placed into a vacuum state.

4. The active phased array antenna apparatus of claim 1, wherein the vacuum vessel is partitioned for each reception circuit corresponding to the antenna element.

5. The active phased array antenna apparatus of claim 1, wherein parts arranged outside the vacuum vessel are formed on one of a single circuit board and a multilayer circuit board, and an electromagnetic coupling scheme is used for connection between a transmission line in the circuit board and a noncontact waveguide connected in the vacuum vessel.

6. The active phased array antenna apparatus of claim 1, wherein output side of the reception signal is connected by an airtight coaxial connector and a coaxial cable for the coupling portion between extremely-low temperature unit side inside of the vacuum vessel and normal temperature unit side outside of the vacuum vessel.

* * * * *